United States Patent
Lagasi

(10) Patent No.: US 11,474,381 B2
(45) Date of Patent: Oct. 18, 2022

(54) OPHTHALMIC ARTICLE

(71) Applicant: ESSILOR ITALIA SOCIETA PER AZIONI, Milan (IT)

(72) Inventor: Matteo Lagasi, Parma (IT)

(73) Assignee: ESSILOR ITALIA SOCIETA PER AZIONI, Milan (IT)

(*) Notice: Subject to any disclaimer, the term of this patent is extended or adjusted under 35 U.S.C. 154(b) by 214 days.

(21) Appl. No.: 16/605,670

(22) PCT Filed: Apr. 18, 2018

(86) PCT No.: PCT/EP2018/059919
§ 371 (c)(1),
(2) Date: Oct. 16, 2019

(87) PCT Pub. No.: WO2018/192983
PCT Pub. Date: Oct. 25, 2018

(65) Prior Publication Data
US 2020/0050024 A1    Feb. 13, 2020

(30) Foreign Application Priority Data

Apr. 19, 2017 (EP) .................................... 17167151

(51) Int. Cl.
*G02B 7/10*    (2021.01)
*G02C 7/10*    (2006.01)
*G02C 7/12*    (2006.01)

(52) U.S. Cl.
CPC .............. *G02C 7/102* (2013.01); *G02C 7/12* (2013.01); *G02C 2202/16* (2013.01)

(58) Field of Classification Search
CPC ...... G02C 7/102; G02C 7/12; G02C 2202/16; G02B 5/23; G02B 1/041; G02B 27/005;
(Continued)

(56) References Cited

U.S. PATENT DOCUMENTS

2007/0148482 A1* 6/2007 Fujinaka ................ G02C 7/108
428/474.4
2013/0329184 A1   12/2013 Barzak et al.
(Continued)

FOREIGN PATENT DOCUMENTS

CN        105008114 A     10/2015
CN        204964919       1/2016
(Continued)

OTHER PUBLICATIONS

Summary of First Office Action from the Chinese Patent Office issued in corresponding Chinese Patent Application No. 2018800255401 dated Jul. 15, 2020.
(Continued)

*Primary Examiner* — Darryl J Collins
*Assistant Examiner* — Matthew Y Lee
(74) *Attorney, Agent, or Firm* — Norton Rose Fulbright US LLP

(57) ABSTRACT

The invention relates to an ophthalmic article (1) in particular for sunglasses, comprising:
first layer (9) made of photochromic cellulose triacetate having a rear face ($9_R$) to be oriented toward an eye (7) of a user and a front face ($9_F$) to be oriented toward the field of vision (13) of the user, and
a second layer (10) made of polyamide having a rear face ($10_R$) to be oriented toward an eye (7) of a user and a front face ($10_F$) to be oriented toward the field of vision (13) of the user,
the first layer (9) being disposed proximate to the field of vision (13) of the user with regard to the second layer (10) being disposed proximate to the eye (7) of the user.

9 Claims, 1 Drawing Sheet

Figure 1:
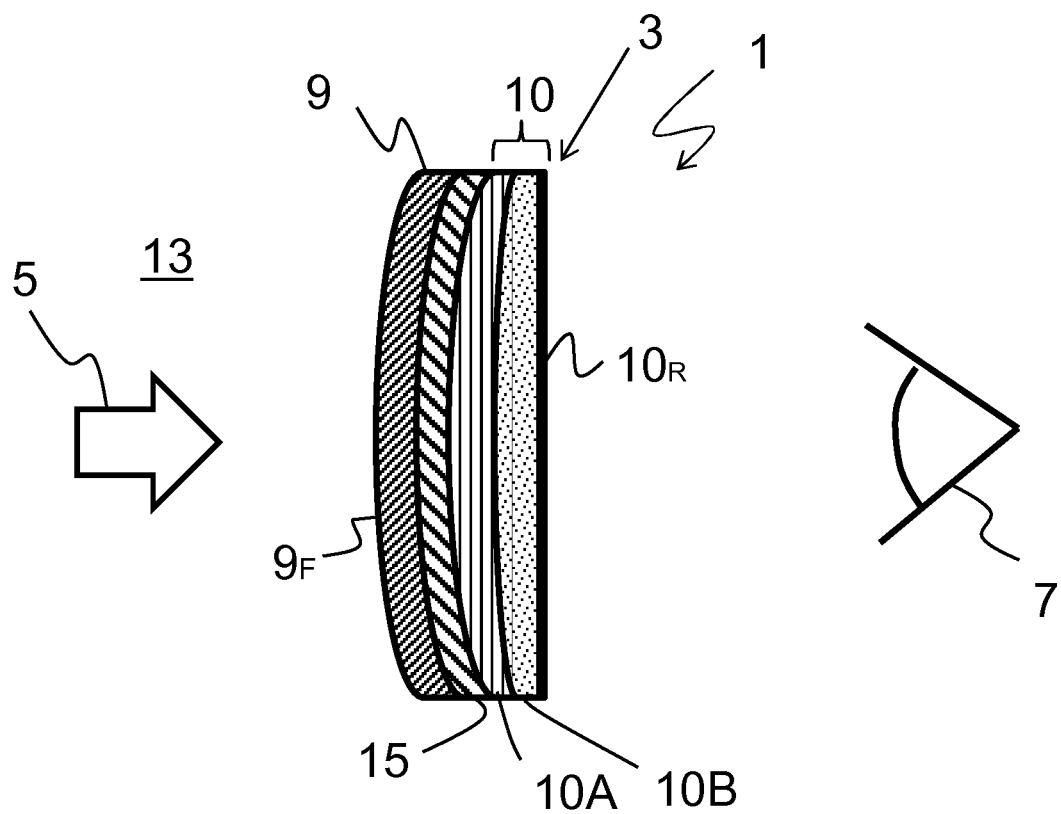

(58) Field of Classification Search
CPC .......... G02B 27/0056; B29D 11/00009; B29D 11/00653; B32B 27/34; B32B 2377/00
See application file for complete search history.

(56) References Cited

U.S. PATENT DOCUMENTS

| | | |
|---|---|---|
| 2014/0334000 A1 | 11/2014 | Clerc et al. |
| 2015/0036097 A1 | 2/2015 | Clerc et al. |
| 2015/0331259 A1* | 11/2015 | Jiang .................. G02C 7/02 351/159.56 |
| 2017/0192256 A1* | 7/2017 | Fujinaka .................. G02C 7/02 |

FOREIGN PATENT DOCUMENTS

| | | |
|---|---|---|
| DE | 102006023965 | 11/2007 |
| EP | 1560060 | 8/2005 |
| WO | WO 2010/132897 | 11/2010 |

OTHER PUBLICATIONS

International Search Report and Written Opinion Issued in Corresponding PCT Patent Application No. PCT/EP2018/059919, dated Jun. 1, 2018.
Office Action issued in Corresponding European Application No. 17167151.4, dated Feb. 17, 2022.

* cited by examiner

OPHTHALMIC ARTICLE

CROSS-REFERENCE TO RELATED APPLICATIONS

This application is a national phase application under 35 U.S.C. § 371 of International Application No. PCT/EP2018/059919 filed Apr. 18, 2018, which claims priority to European Patent Application No. 17167151.4 filed Apr. 19, 2017. The entire contents of each of the above-referenced disclosures is specifically incorporated by reference herein without disclaimer.

The present invention relates to an ophthalmic article.

The term "ophthalmic article" is specifically understood to mean a lens, corrective or otherwise, that can be used as spectacle glass, for spectacles for example, particularly sunglasses, visors or the like.

Photochromism is a phenomenon of reversible changes in color, which takes place when compounds of a certain sort are exposed for example to sunlight or ultraviolet-containing light.

Lenses making use of the above-mentioned function of such compounds are widely known as photochromic lenses. They have been finding wide-spread commercial utility in sunglasses, prescription eyeglasses, goggles and so on.

However known photochromic lenses are quite expensive and complex to manufacture.

The present invention therefore aims to propose an ophthalmic article that has photochromic properties and is less expensive and easy to manufacture.

With this aim, the invention proposes an ophthalmic article in particular for sunglasses, comprising:
- a first layer made of photochromic cellulose triacetate having a rear face to be oriented toward an eye of a user and a front face to be oriented toward the field of vision of the user, and
- a second layer made of polyamide having a rear face to be oriented toward an eye of a user and a front face to be oriented toward the field of vision of the user,
- the first layer being disposed proximate to the field of vision of the user with regard to the second layer being disposed proximate to the eye of the user.

It is thus possible to obtain photochromic glasses at low cost in an easy way.

Further, the obtained photochromic lens has an improved fatigue resistance of the photochromic feature with regard to other method provided. Further, using the principle of the invention, the photochromic dye is spread much more uniformly as compared to other methods of adding a photochromic layer on piano lenses. Indeed, when compared to methods such as adding photochromic dyes in a coating or in a glue layer, the method of the invention is prone to have less blotchy color when the photochromic dye is activated and a more uniform tint, without unwanted gradient when compared to dip coating techniques which can produce lenses clearer at the top and darker at the bottom.

The ophthalmic article may present the following aspects separately or in combination.

According to one aspect, the ophthalmic article comprises a third layer made of polarizing polyvinyl alcohol which is disposed between the first layer and the second layer.

The third layer may be linearly polarized.

Said layers are for example fixed together by thermoforming or by injection molding.

The second layer made of polyamide may comprise a first sub-layer made of polyamide and a second sublayer made of polyamide.

According to a further aspect, one of said first or second sub-layers is tinted by addition of a pigment or a colorant.

One of said first or second sub-layers may be a non-tinted crystal sub-layer.

Moreover, the sub-layer which is to be closest to the eye of the user is a non-tinted crystal sub-layer.

One may foresee a hard coat is applied on the front face of the first layer.

According to another aspect, the rear face of the second layer is surface finished for a corrective effect.

The first layer may have a thickness comprised between 0.05 mm and 1 mm.

The second layer may have a thickness comprised between 0.02 mm and 1 mm.

The third layer may have a thickness comprised between 0.01 mm and 1 mm.

Figure 2:
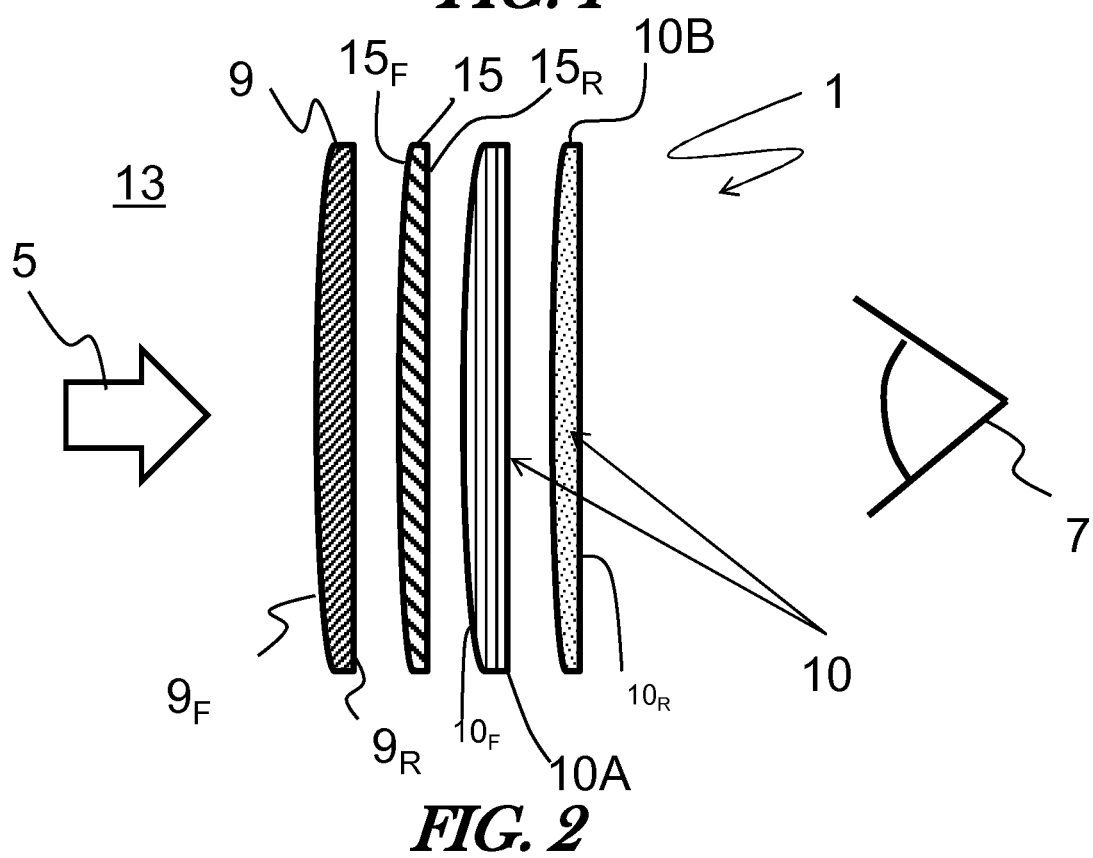

Other advantages and features will become apparent upon reading the description of the following figures, among which:

FIG. 1 shows a schematic section view of an ophthalmic article according to the invention, FIG. 2 is an exploded view of the layers of FIG. 1.

On all the figures, the same elements bear the same reference numbers.

The following embodiments are only examples. Although the description refers to one or several embodiments, the invention is not limited to theses embodiments. In addition, a feature described in relationship with one embodiment may also concern another embodiment even if this is not mentioned expressively. Simple features of different embodiments may also be combined to provide further realizations.

In the present description, by "front" or "back" face of a layer, reference is made to the propagation of the rays of light towards the eye. Thus a "front" face is always that which is closest to the user's field of view and a "rear" face is always that which is closest to the eye of the user.

By "upstream" or "downstream" of two elements or layers, one refers to the propagation of the rays of light towards the eye. Thus, a first element is disposed upstream of a second element when the light passes through its path towards the eye of the user first through the first element and then through the second element. Conversely, a first element is disposed "downstream" of a second element when the light passes through its path towards the eye of the user first through the second element and then through the first element.

The terms "crystal" or "crystal glass" are understood to mean a glass/optical material of the class 0 according to the standardized international definition of glasses into five categories of light transmission. It is a glass having in the visible spectrum a light transmission range comprised between 80% and 100%.

The ophthalmic article 1 of FIGS. 1 and 2 is for example intended to be used for spectacles, in particular sunglasses. To do this, it is only necessary to shape the outer edge 3 according to the desired shape of the frame of the eyeglasses or sunglasses.

In FIGS. 1 and 2, the light incident on the ophthalmic article 1 and an eye 7 representing a user are shown by the arrow 5. The field of view 13 is thus situated on the side of the arrow 5 and the user looks through the ophthalmic article 1 with his eye 7.

By ophthalmic article 1 is meant a corrective lens or not, finished or semi-finished, suitable for being mounted in a frame, for example a spectacle frame, a mask or a visor intended to be placed in front of the eyes and forming a screen of visual protection.

The ophthalmic article 1 comprises at least two layers, a first layer 9 and a second layer 10 and at most three layers, a first layer 9, a second layer 10 and a third layer 15 sandwiched between the first layer and the second layer 10.

In this context, treatments conferring additional functions, either alone or in combination among the following non-exhaustive list: shockproof, anti-scratch, anti-abrasion, anti-reflective, anti-fouling, anti-fogging, anti-static are not considered as additional layers. These additional functions can be carried out according to conventional methods (soaking, vacuum deposition, spin coating, spray coating, etc.).

The first layer 9 is made of photochromic cellulose triacetate (photochromic TAC) and has a rear face $9_R$ to be oriented toward the eye 7 of the user and a front face $9_F$ to be oriented toward the field of vision 13 of the user. The first layer 9 has a thickness comprised between 0.05 mm and 1 mm, preferentially comprised between 0.1 mm and 0.8 mm, preferentially between 0.15 mm and 0.5 mm, for example 0.18 mm.

The second layer 10 is made of polyamide (PA) and has a rear face $10_R$ to be oriented toward the eye 7 of a user and a front face $10_F$ to be oriented toward the field of vision 13 of the user. The second layer 10 has a thickness comprised between 0.02 mm and 1 mm, preferentially comprised between 0.05 mm and 0.8 mm, preferentially between 0.1 mm and 0.5 mm, for example 0.15 mm.

As can be seen in FIGS. 1 and 2, the first layer 9 is disposed proximate to the field of vision 13 of the user with regard to the second layer 10 that is disposed proximate to the eye 7 of the user.

The optional third layer 15 is made of polarizing, in particular linearly polarizing polyvinyl alcohol which is disposed between the first layer 9 and the second layer 10. The third layer has a thickness comprised between 0.01 mm and 1 mm preferentially comprised between 0.02 mm and 0.2 mm, for example 0.02 mm, 0.05 mm, 0.07 mm.

In any cases, the entire stack of layers, comprising the photochromic TAC and the PA layer and a potential intermediate polarized third layer has a thickness comprised between 0.15 mm and 1 mm, preferentially comprised between 0.2 mm and 0.8 mm.

The third layer 15 has a rear face $15_R$ to be oriented toward the eye 7 of a user and a front face $15_F$ to be oriented toward the field of vision 13 of the user.

When assembled, for example through thermoforming or injection molding, the rear face $9_R$ of the first layer 9 is in contact with the front face $15_F$ of the third layer 15 and the rear face $15_R$ of the third layer 15 is in contact with the front face $10_F$ of the second layer 10.

It is important that the first layer 9 is disposed upstream the second layer 10 and the third layer 15 in order that the light rays pass first through the first layer 9 made of photochromic TAC, before going through the third layer 15 or the polarized optional third layer 10. This enable the UV part of the light spectrum to activate of the photochromic compounds contained in the photochromic TAC with the best efficiency.

In the not shown simplified embodiment having only two layers, a first layer 9 made of photochromic TAC and second layer 10 made of polyamide, the rear face $9_R$ of the first layer 9 is in contact with the front face $10_F$ of the second layer 10.

As shown in the figures, the second layer 10 may comprise a first sub-layer 10A made of polyamide and a second sub-layer 10B made of polyamide and disposed downstream the first sub-layer.

One of said first 10A or second 10B sub-layers, in particular the first sub-layer 10A is tinted by addition of a pigment or a colorant, whereas the other sub-layer, in particular sub-layer 10B which is to be closest to the eye of the user, is a non-tinted crystal sub-layer.

In this case the rear face $10_R$ of the second layer 10 may be surface finished for a corrective effect.

A hard coat treatment may be applied on the front face $9_F$ of the first layer 9.

The ophthalmic article 1 may be manufactured in the following way.

In a first embodiment, the first layer 9, the second layer 10 and optionally the third layer 13 are provided and assembled as stack through thermoforming by applying pressure and heat to the stack of layers.

In a second embodiment, the first layer 9 and optionally the third layer 13 are provided, for example fixed together by virtue of a glue and put in a mold adapted to receive the first and optionally the third layer. Then, the second layer 10 is realized by injection molding of polyamide, either in one step to form the whole second layer or in two steps forming subsequently each of the sub-layers 10A and 10B.

From the above, it turns out that an ophthalmic article according to the invention is easy to manufacture at low cost.

The invention claimed is:

1. An ophthalmic article, comprising:
    a first layer made of photochromic cellulose triacetate having a rear face to be oriented toward an eye of a user and a front face to be oriented toward the field of vision of the user;
    a second layer made of polyamide having a rear face to be oriented toward an eye of a user and a front face to be oriented toward the field of vision of the user;
    the first layer being disposed proximate to the field of vision of the user with regard to the second layer being disposed proximate to the eye of the user;
    wherein the second layer made of polyamide comprises a first sublayer made of polyamide and a second sublayer made of polyamide;
    wherein the sublayer which is closer to the eye of the user is a non-tinted crystal sublayer; and
    wherein the sublayer which is further from the eye of the user is tinted by a pigment or a colorant.

2. The ophthalmic article as claimed in claim 1, comprising a third layer made of polarizing polyvinyl alcohol which is disposed between the first layer and the second layer.

3. The ophthalmic article as claimed in claim 2, wherein the third layer is linearly polarized.

4. The ophthalmic article as claimed in claim 2, wherein the third layer has a thickness comprised between 0.01 mm and 1 mm.

5. The ophthalmic article as claimed in claim 1, wherein said layers are fixed together by thermoforming or by injection molding.

6. The ophthalmic article as claimed in claim 1, wherein a hard coat is applied on the front face of the first layer.

7. The ophthalmic article as claimed in claim 1, wherein the rear face of the second layer is surface finished for a corrective effect.

8. The ophthalmic article as claimed in claim 1, wherein the first layer has a thickness comprised between 0.5 mm and 1 mm.

9. The ophthalmic article as claimed in claim 1, wherein the second layer has a thickness comprised between 0.02 mm and 1 mm.

\* \* \* \* \*